(12) United States Patent
Jones et al.

(10) Patent No.: US 7,124,864 B2
(45) Date of Patent: Oct. 24, 2006

(54) QUICK RELEASE SOCKET CONNECTOR

(75) Inventors: Steven D. Jones, E. Grand Rapids, MI (US); Glen R. Wilkinson, III, Plainwell, MI (US); James E. Doyle, Grandville, MI (US)

(73) Assignee: Suspa Incorporated, Grand Rapids, MI (US)

(*) Notice: Subject to any disclaimer, the term of this patent is extended or adjusted under 35 U.S.C. 154(b) by 335 days.

(21) Appl. No.: 10/656,484

(22) Filed: Sep. 5, 2003

(65) Prior Publication Data

US 2004/0076464 A1 Apr. 22, 2004

Related U.S. Application Data

(60) Provisional application No. 60/409,132, filed on Sep. 9, 2002.

(51) Int. Cl.
*F16F 9/00* (2006.01)
(52) U.S. Cl. .................. 188/321.11; 403/122; 403/397; 403/322.4
(58) Field of Classification Search ............... 403/122, 403/397, 322.4; 188/321.11, 112 R, 3 R
See application file for complete search history.

(56) References Cited

U.S. PATENT DOCUMENTS

| | | | |
|---|---|---|---|
| 1,938,860 A * | 12/1933 | Renfer | 279/19.4 |
| 4,268,018 A * | 5/1981 | Langanke | 267/120 |
| RE31,635 E | 7/1984 | Smith et al. | |
| 5,372,446 A | 12/1994 | Chamberlin | |
| 5,409,320 A | 4/1995 | Maury et al. | |
| 5,417,512 A | 5/1995 | Chamberlin | |
| 5,833,383 A | 11/1998 | Bauman | |
| 6,505,989 B1 * | 1/2003 | Pazdirek et al. | 403/135 |

* cited by examiner

*Primary Examiner*—Devon Kramer
(74) *Attorney, Agent, or Firm*—Price, Heneveld, Cooper, DeWitt & Litton, LLP

(57) ABSTRACT

A coupling member includes a body having a socket for receiving a mating ball with the body including a recess for receiving a cam member over which a generally C-shaped spring extends. The body includes slots for receiving the ends of the C-shaped spring which engage a ball for locking the coupling member to the ball. The cam includes a lever which is operator accessed for rotating the cam to move the spring from a locking position to an unlocking position with respect to the body and ball to which the body is coupled for allowing the end of the body attached, for example, to a gas assist strut to be removed from the mating ball.

10 Claims, 4 Drawing Sheets

QUICK RELEASE SOCKET CONNECTOR

CROSS-REFERENCE TO RELATED APPLICATIONS

This application claims priority under 35 U.S.C. § 119(e) on U.S. Provisional Application No. 60/409,132 entitled QUICK RELEASE SOCKET CONNECTOR, filed on Sep. 9, 2002, by Steven D. Jones, et al., the entire disclosure of which is incorporated herein by reference.

BACKGROUND OF THE INVENTION

The present invention relates to a ball and socket connector for a gas assist strut and more particularly to one which facilitates decoupling of the socket from the mating ball.

Gas assist struts are widely used for coupling pivotal members to fixed members to facilitate the opening of relatively heavy items, such as car or truck hoods, trunk lids, container covers, pickup truck bed covers, and the like. Typically, gas assist struts have one end coupled to a fixed member, such as the body of the vehicle or storage container, and the other end coupled by a ball and socket connector to the movable and sometimes removable cover. On occasion, it becomes necessary to either replace a gas assist strut or it may be desirable to remove the cover to which the strut is coupled. In the past, a variety of proposals have been made which allow the decoupling of the ball and socket connection which typically includes a relatively heavy spring for locking the coupling member to the ball. In some constructions, a slidable locking member is provided which can be moved in a direction orthogonal to the vertical axis of the ball to decouple the socket member from the ball, allowing removal of the strut from the pivoted member to which it is attached. Although such structure allows relatively easy decoupling of the ball and socket connection, it is somewhat complicated and itself requires a locking mechanism such that the slide does not inadvertently move to allow decoupling of the connection.

More typically, a socket connector for a ball and socket connection has included a generally C-shaped spring which has ends which lockably fit over the ball. The body of the connector to which the spring is attached in such units includes a recess allowing the spring to be pried from a locking position to a releasing position utilizing a tool, such as a screwdriver, to allow the decoupling of the ball socket connection. While providing the desired safe coupling of one or both ends of a gas assist strut with a socket connection to an associated ball, the requirement of separate tools is frequently inconvenient for the user, particularly where the gas assist strut is used in connection with removable covers where it is frequently desired to be disconnected for removal.

Accordingly, there exists a need for a ball socket connector and particularly one for gas assist struts which allows relatively easy removal but provides positive safe locking action when in a coupled position.

SUMMARY OF THE INVENTION

The present invention satisfies this need by providing a coupling body having a socket for receiving a mating ball with the body including a recess for receiving a movable cam member over which a generally C-shaped spring extends. The body includes slots for receiving the ends of the C-shaped spring which engage a ball for locking the coupling member to the ball. The cam member includes a lever which can be operator accessed for rotating the cam to move the spring in a controlled manner from a locked position to an unlocked or decoupling position with respect to the body and ball to which the body is coupled for allowing the end of the body, such as may be attached to a gas assist strut, to be removed from the mating ball. With such a system, therefore, the coupling member itself includes a mechanism for allowing an operator to decouple a member, such as a gas assist strut, from a mating ball without the requirement of tools and which allows repeated coupling and decoupling as desired.

These and other features, objects and advantages of the present invention will become apparent upon reading the following description thereof together with reference to the accompanying drawings.

DETAILED DESCRIPTION OF THE PREFERRED EMBODIMENT

Figure 1:
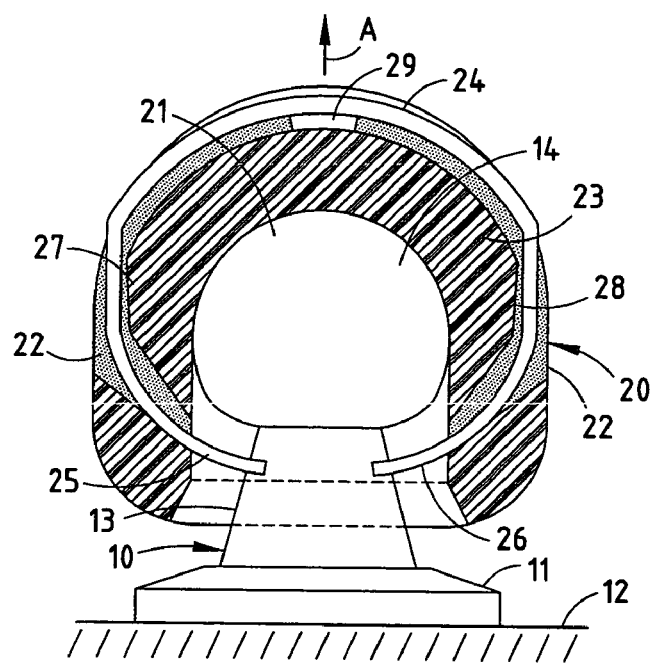
FIG. 1 is a cross-sectional view of a prior art ball and socket coupling mechanism for a gas assist strut.

FIG. 1 is a vertical cross-sectional view of a conventional ball and socket connecting assembly in which a ball assembly 10 is mounted to a fixed or movable object 12 to which a second member, such as a gas assist strut, is pivotally coupled. Ball assembly 10 includes a base 11 including a threaded stud for threading into a threaded aperture in member 12, a post 13 extending upwardly therefrom, and a spherical ball 14 for receiving a mating connector 20. Connector 20 can be mounted to an end of a gas assist strut or other member using a conventional threaded coupling. Member 20 has a body 23 which includes a spherical socket 21 for receiving ball 14, which is captively held within the socket 21 by C-shaped spring 24. Slots 22 on opposite sides captively receive the generally C-shaped spring 24, which has ends 25 and 26 which fit under and engage ball 14 and post 13 when in a locked position as shown, preventing member 20 coupled to the end of the strut from being removed from the ball while allowing free pivoting and rotation of the end of a gas assist strut with respect to ball assembly 10 and member 12.

To decouple the connector 20 from ball assembly 10, it is necessary to provide a slot, such as slot 29 in member 20 underlying the apex of spring 24, allowing a prying instrument, such as a flat-bladed screwdriver, to be inserted therein and provide a significant upward force in a direction indicated by arrow A in FIG. 1 to move the ends of spring 24 outwardly in converging slots 22 a distance sufficient to allow ball assembly 10 to freely exit socket 21. Thus, spring 24 must be carefully moved until ends 25 and 26 engage the flat sides 27 and 28, respectively, within slots 22 of the connector 20 for holding the spring to the connector in a decoupling position. Although such construction allows the positive locking of the coupling member 20 to ball assembly 10, it requires the use of a separate tool and careful movement of the spring such that it does not break free from the connector body 23. When it is desired to decouple a gas assist strut from the ball assembly in an environment in which it is frequently desired to decouple the gas assist strut from a member, such a requirement can become somewhat of an annoyance to the operator.

To solve this problem and still provide the desired positive coupling to a ball assembly utilizing a coupling member for coupling, for example, to a gas assist strut, the system of the present invention incorporates a coupling member having a body with a cam member interposed between the body and the locking spring. The cam member is movable by a control lever to allow the operator to easily move the spring in a controlled manner to decouple the end of the gas assist strut from a mating ball. The invention is best understood by reference to the accompanying drawings, first with reference to FIGS. 2–4 illustrating its operation.

Figure 2:
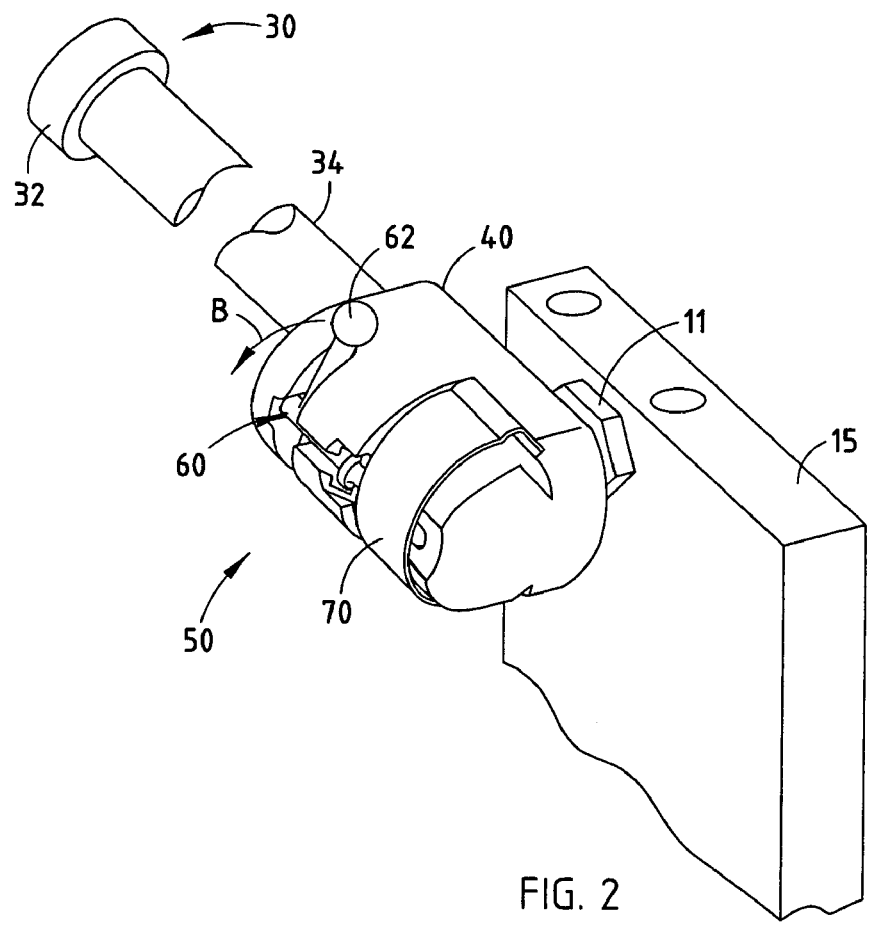
FIG. 2 is a fragmentary perspective view of a ball and socket connection of the present invention coupled to one end of a gas assist strut and shown in a locked position.

In FIG. 2, there is shown a gas assist strut 30 having a cylinder body 32 with a rod end 34 movably extending therefrom and coupled to the body 40 of a coupling member 50 of the present invention. Member 50 is coupled, in turn, to a ball, such as the ball assembly 10 of FIG. 1, which is threaded into member 15. The other end of the gas assist strut body 32 will typically be coupled to another member using the same type of coupling member 50 and ball 10 to allow the pivotal movement of member 15 with respect to the member to which the other end of the gas assist strut 30 is coupled. Thus, the end of body 32 typically is pivotally mounted either by a similar connection as shown in FIGS. 2–4 or by some other pivot connection to allow a pivoted member 15 to be pivotally movable with respect to the fixed member with the assistance of the gas assist strut 30. To allow the easy decoupling of coupling member 50 from ball assembly 10, the body 40 has movably mounted thereto a cam member 60 underlying locking spring 70. Cam member 60 has a control lever 62 which conveniently extends, as seen in FIGS. 2–4, from the body 40 of coupling member 50 and can be rotated in the direction indicated by arrow B in FIG. 2 from a locked position in FIG. 2 to an unlocked position as shown in FIGS. 3 and 4.

Figure 3:
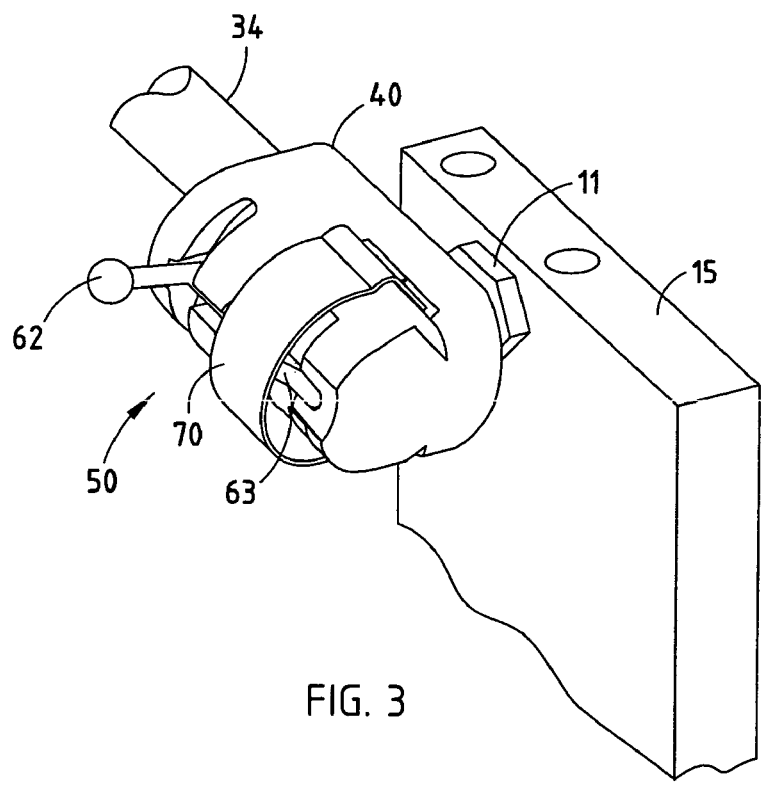
FIG. 3 is a fragmentary perspective view of the structure shown in FIG. 2, shown with the locking spring of the coupling member moved to an unlocked position.
Figure 4:
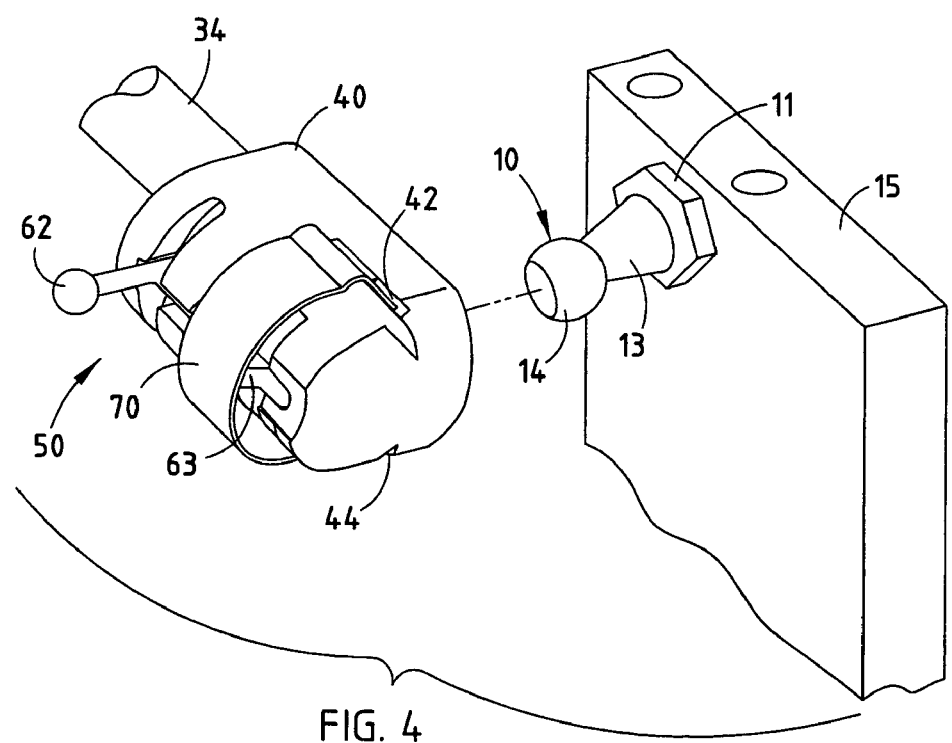
FIG. 4 is a fragmentary perspective view of the structure shown in FIGS. 2 and 3, shown with the coupling member disconnected from the ball.

The coupling assembly 50 of the present invention further includes the generally C-shaped spring 70 which, under the influence of cam member 60 and particularly a cam coupling a control blade 63 thereof, is urged from the locking position as shown in FIG. 2 outwardly from slots 42 and 44 in body 40 to an unlocked position as shown in FIGS. 3 and 4, allowing the decoupling of coupling member 50 from ball assembly 10. Ball assembly 10 includes, as seen in FIG. 4, a generally spherical ball 14 mounted by a post 13 to a base 11 which is secured to a member 15, typically a threaded post, extending from base 11 in a direction opposite ball 14. Thus, as seen in FIGS. 2–4, by operation of the control lever 62 of cam 60, the coupling member 50 can effectively be decoupled and removed from the associated ball assembly 10 by the rotation of control handle 62 to move spring 70 from a locking position to an unlocking position. The details of construction of the body 40, cam 60 and spring 70 is now described in connection with FIGS. 5–8.

Figure 5:
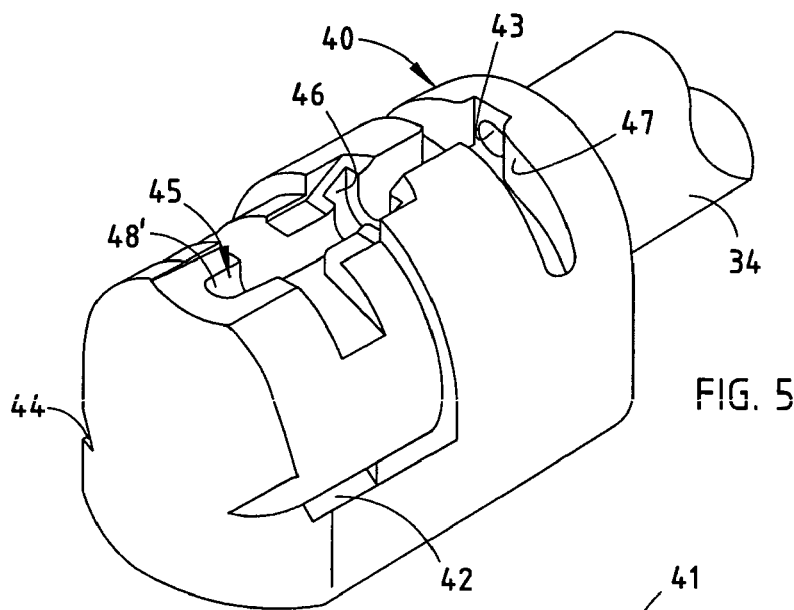
FIG. 5 is an enlarged fragmentary top perspective view of the body of the coupling member shown in FIGS. 2–4, shown with the spring and cam removed therefrom.
Figure 6:
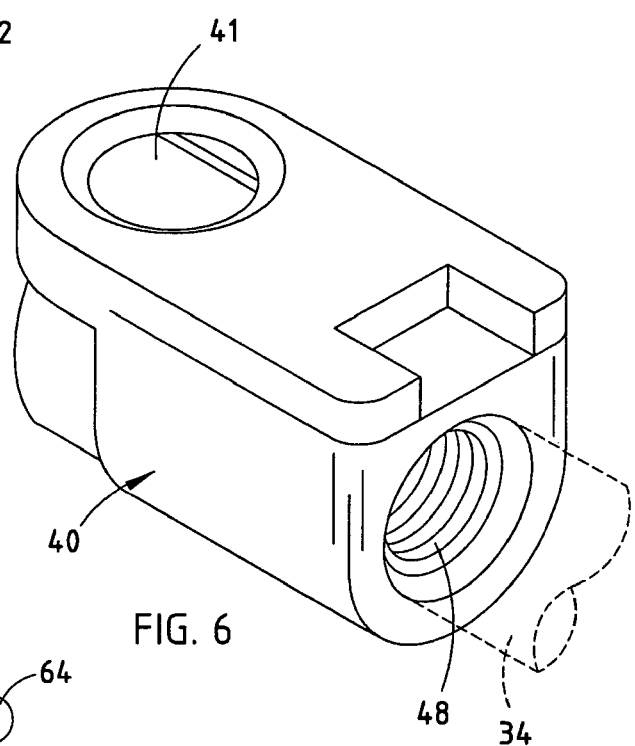
FIG. 6 is a bottom perspective view of the coupling member shown in FIG. 5.

As seen in FIG. 5, body 40, which is molded of a suitable polymeric material such as 33% glass-filled nylon, polycarbonate, ABS, or the like, is integrally molded and is threadably coupled to a threaded end of rod 34 of, for example, a gas assist strut 30. In one embodiment, body 40 includes a threaded aperture 48 (FIG. 6) which threadably receives a threaded end of rod 34. Body 40 defines a spherical socket 41 (FIG. 6) for extending over and receiving ball 14. Communicating with this spherical socket 41 are a pair of slots 42 and 44 which receive the ends 72 and 74 (FIG. 9) of spring 70, as seen in FIGS. 3 and 4 and in detail in FIGS. 10 and 11.

Figure 7:
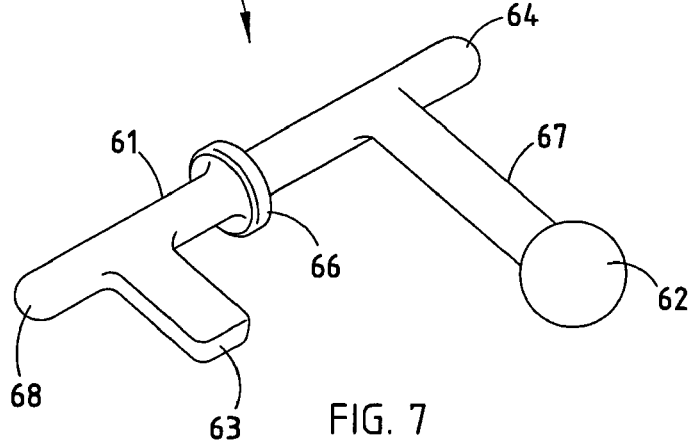
FIG. 7 is a fragmentary perspective view of the cam employed in the connector of the present invention.
Figure 8:
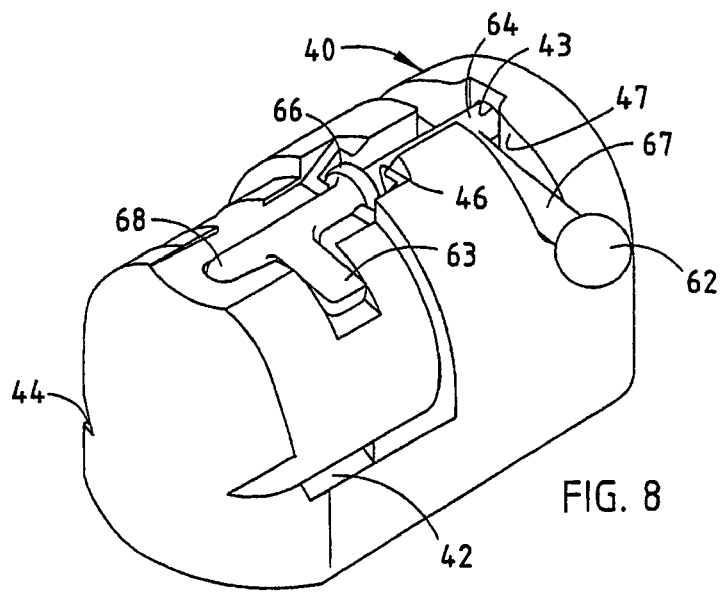
FIG. 8 is a perspective view of the cam mounted within the body shown in FIG. 5.
Figure 10:
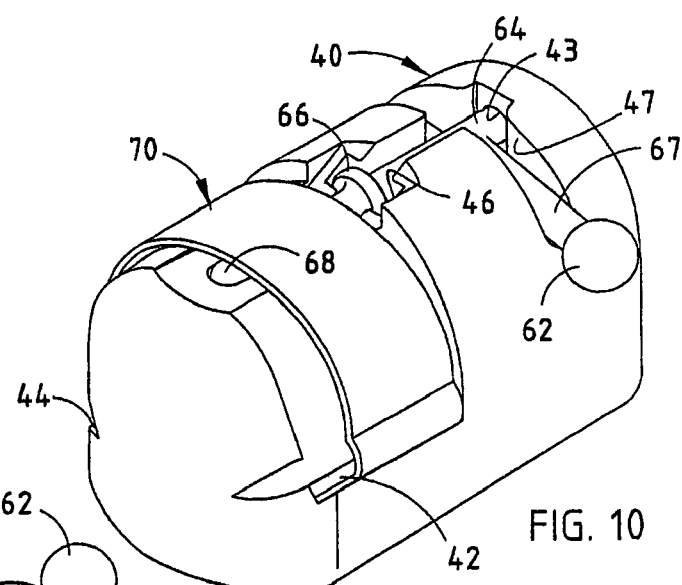
FIG. 10 is an enlarged perspective view of the coupling member of the present invention, shown in a locked position.
Figure 11:
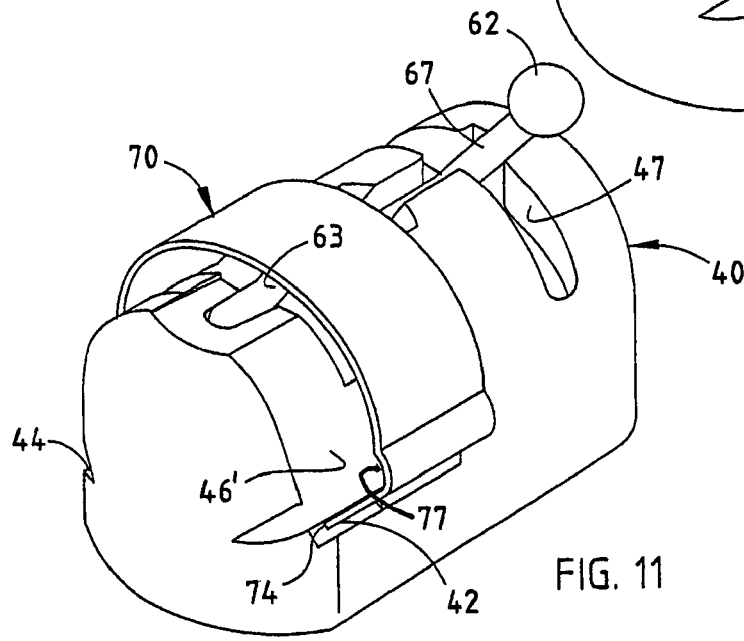
FIG. 11 is an enlarged perspective view of the coupling member of the present invention shown in an unlocked position.

Body 40 also includes a cylindrical blind socket 43 at one end aligned with a generally semicylindrical recess 45 extending longitudinally along the body for nestably receiving cylindrical end 68 of cam 60 (FIGS. 7 and 8). For such purpose, body 40 also includes an enlarged semicylindrical recess 46 for receiving collar 66 of cam 60 therein, while socket 43 receives end 64 of cam 60, as best seen in FIG. 8. Body 40 also includes a transverse arcuate 180° slot 47 for receiving the arm 67 of control handle 62 therein, and a semicylindrical end 48' of recess 45 for receiving the tip end 68 of cam 60. Thus, body 40 includes a configured recess 45 adapted to receive cam 60 therein and positively hold cam 60 within aperture 45 when spring 70 is extended over cam 60 and fitted within slots 42 and 44 of body 40, as best seen in FIGS. 10 and 11.

Figure 9:
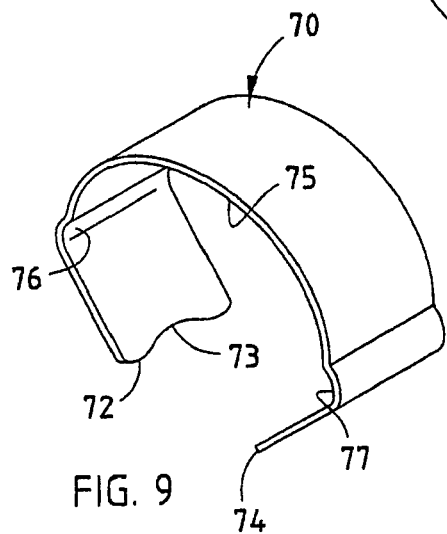
FIG. 9 is an enlarged perspective view of the generally C-shaped spring shown in FIGS. 2–4.

Spring 70 is generally C-shaped, as seen in FIG. 9, and includes tip ends 72 and 74 which have a semicylindrical curve 73 along their edges to surround ball 14 of ball assembly 10 when in a locked position as shown in FIG. 2. The spring includes an inner semicylindrical surface 75 which is engaged by the tip of blade 63 of cam 60, as seen in FIGS. 3, 4 and 11, when the cam is rotated approximately 90° from a locked position as shown in FIG. 2 to a decoupling position as shown in FIGS. 3, 4, and 11. The spring further includes semicylindrical sockets 76 and 77 which receive and hold the tip end of control blade 63 when in the locked position as shown in FIG. 2 or rotated 90° in either direction within transverse slot 47 of body 40 to positively hold the cam 60 in a locking position regardless of the installed orientation of spring 70. The control lever or handle 62 has a convenient ball-shaped end which extends from body 40, as seen in FIGS. 2 and 10, to allow the operator to easily grip the handle 62 and rotate the cam, thereby urging the spring from its locked position shown in FIGS. 2 and 10 in a controlled manner to an unlocked position shown in FIGS. 3, 4, and 11, allowing end 34 of gas strut 30 to be decoupled from ball assembly 60. A similar coupling system can be employed to couple the opposite end of strut 30 to a fixed or movable body.

The length of blade 63 is selected to control the outward movement of spring ends 72 and 74 away from the ball to engage opposite curved sides 46' (FIG. 1) of body 40 for holding the spring in an unlocked position while holding the spring onto body 40. As handle 42 is rotated 90° to either side, ends 72 and 74 of spring 70 will slide along curved walls 46' toward the body back to the locked position shown in FIG. 10. The blade 63 is radially aligned with handle 62 such that the location of the locked and unlocked positions are easily, intuitively determined by the operator.

Thus, with the system of the present invention, the decoupler mechanism integrally includes structure which allows the coupler to be decoupled from a ball repeatedly without the necessity of using a separate tool. In the preferred embodiment of the invention, the cam 60 was metallic, made of a suitably treated die cast zinc or aluminum, while spring 70 was made of spring steel. The cam was nestably received within body 40 and locked therein by the pivotal anchoring of end 64 within aperture 44 and held in place by spring 70 overlying the camming element 63 of cam 60 opposite end 64. Collar 66 assures proper seating and alignment of cam 60 within body 40. The coupling member 40 is easily coupled in locking engagement with an associated ball and can be decoupled utilizing the integrated cam 60 for releasing the coupling body from the ball without the use of tools.

It will become apparent to those skilled in the art that various modifications to the preferred embodiment of the invention as described herein can be made without departing from the spirit or scope of the invention as defined by the appended claims.

The invention claimed is:

1. A gas assist strut and coupling member for pivotally coupling an end of a gas assist strut to an associated mounting ball comprising:
   a gas assist strut having a movable rod extending therefrom;
   a body coupled to an end of said rod having a spherical socket with a pair of slots communicating with said socket for receiving a generally C-shaped spring, said body further including a recess configured to receive a cam;
   a cam including a cam element and control handle, said cam nestably received within said recess of said body; and
   a generally C-shaped spring having ends and a center section, wherein said center section has a width covering said cam element when said spring is positioned over said cam for engaging said body, wherein said ends of said C-shaped spring extend within said slots of said body for lockably engaging a ball, wherein said cam element when moved from a locking position to an unlocking position engages said center section of said spring and urges said ends of said spring at least partially out of said slots for releasing said body from an associated ball to decouple said strut from the associated ball.

2. The structure as defined in claim 1 wherein said body is made of a polymeric material.

3. The structure as defined in claim 1 wherein said body is integrally molded.

4. The structure as defined in claim 1 wherein said cam comprises a generally cylindrical member having a control handle near one end and a cam element spaced from said handle.

5. The structure as defined in claim 4 wherein said body includes a socket for receiving one end of said cam.

6. The structure as defined in claim 1 wherein said cam element has a length selected to control the movement of said spring between locking and unlocking positions.

7. A gas assist strut and coupling member for pivotally coupling an end of a gas assist strut to an associated mounting ball comprising:
   a gas assist strut having a movable rod extending therefrom;
   a body coupled to an end of said rod having a spherical socket with a pair of slots communicating with said socket for receiving a generally C-shaped spring, said body further including a recess configured to receive a cam and includes a socket for receiving one end of said cam;
   a cam including a cam element and control handle, said cam nestably received within said recess of said body, wherein said cam comprises a generally cylindrical member having a control handle near one end and a cam element spaced from said handle; and
   a generally C-shaped spring positioned over said cam and engaging said body with said C-shaped spring including ends extending within said slots of said body for lockably engaging a ball, wherein said cam element when moved from a locking position to an unlocking position urges said ends of said spring at least partially out of said slots for releasing said body from an associated ball to decouple said strut from the associated ball, and wherein said spring has at least one semicylindrical recess for receiving an end of said cam element of said cam when in a locking position.

8. The structure as defined in claim 7 wherein said spring has a pair of spaced semicylindrical recesses for holding said cam element in one of two locking positions.

9. A gas assist strut and coupling member for pivotally coupling an end of a gas assist strut to an associated mounting ball comprising:
   a gas assist strut having a movable rod extending therefrom;
   a body coupled to an end of said rod having a spherical socket with a pair of slots communicating with said socket for receiving a generally C-shaped spring, said body further including a recess configured to receive a cam;
   a cam including a cam element and control handle, said cam nestably received within said recess of said body, wherein said recess of said body includes an arcuate slot extending through an arc of about 180° for receiving said control handle; and
   a generally C-shaped spring positioned over said cam and engaging said body with said C-shaped spring including ends extending within said slots of said body for lockably engaging a ball, wherein said cam element when moved from a locking position to an unlocking position urges said ends of said spring at least partially out of said slots for releasing said body from an associated ball to decouple said strut from the associated ball, wherein said cam element has a length selected to control the movement of said spring between locking and unlocking positions.

10. The structure as defined in claim 9 wherein said cam element comprises a blade radially aligned with said control handle.

* * * * *